J. V. DEVER.
RIM CHAIN FASTENER.
APPLICATION FILED APR. 26, 1921.

1,438,224.

Patented Dec. 12, 1922.

Inventor:
John V. Dever,
by Robt. P. Harris
Attorney

Patented Dec. 12, 1922.

1,438,224

UNITED STATES PATENT OFFICE.

JOHN VINCENT DEVER, OF NIAGARA FALLS, ONTARIO, CANADA, ASSIGNOR TO THE COLUMBUS McKINNON CHAIN CO., OF COLUMBUS, OHIO, A CORPORATION OF OHIO.

RIM-CHAIN FASTENER.

Application filed April 26, 1921. Serial No. 464,627.

*To all whom it may concern:*

Be it known that I, JOHN VINCENT DEVER, a subject of the King of Great Britain, and residing at Niagara Falls, Ontario, Canada, have invented an Improvement in Rim-Chain Fasteners, of which the following description, in connection with the accompanying drawings, is a specification, like characters on the drawings representing like parts.

This invention relates to a chain tightener and fastener, and the present device, although well adapted for various uses, is particularly well adapted for use upon non-skid tire chains as a rim chain fastener.

In securing non-skid chains upon automobile tires, it is desirable that the rim chains be provided with fasteners which are so constructed that they will serve to tighten the chains about a tire, and to secure the ends of the chains together.

Since it is necessary at frequent intervals to apply non-skid chains to automobile tires and to remove them therefrom, it is important that the chain fasteners be so constructed that they may be easily and quickly manipulated. It is also important that the fasteners be so constructed that they will not become accidentally disengaged while in use.

Various types of chain fasteners have been proposed heretofore in an effort to meet the above requirements, but none of these fasteners have been found entirely satisfactory. In one type of fastener that has gone into use, the fastener is given the form of a lever which serves to draw the ends of a chain towards each other as the lever is swung into parallel relation with the chain, and the lever is secured in this position by a spring hook which embraces one side of one of the links. This type of fastener, while possessing desirable features, is open to the objection that the spring is liable to break, and when the fastener is used in mud or snow, the spring hook becomes clogged so that it cannot be readily manipulated.

One important object of the present invention therefore, is to provide a chain tightener and fastener which satisfactorily meets the above requirements while it is free from the objections just mentioned.

Another important object of the invention is to provide a strong and durable fastener which is simple in construction and is inexpensive to manufacture.

The accompanying drawing illustrates a good practical form of the invention, the details of which may be modified within the true scope thereof as defined by the claims.

Figure 1:
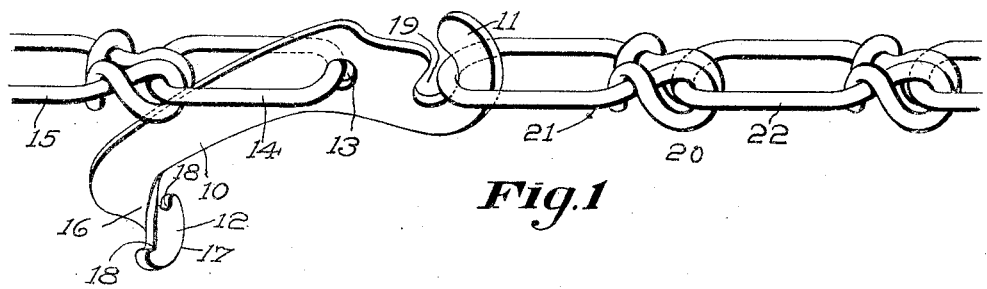
Fig. 1 is a perspective view of the chain fastener shown in the position it assumes in the first step of connecting chains or ends of a chain.

In the embodiment of the invention illustrated, the fastener 10 consists of a lever having a chain engaging hook 11 at one of its ends and a head 12 at its opposite end. The fastener 10 preferably is provided with an aperture 13 located intermediate of the end of the lever, and this aperture is adapted to receive a link 14 or other suitable means for securing the fastener to a chain 15.

Figure 6:
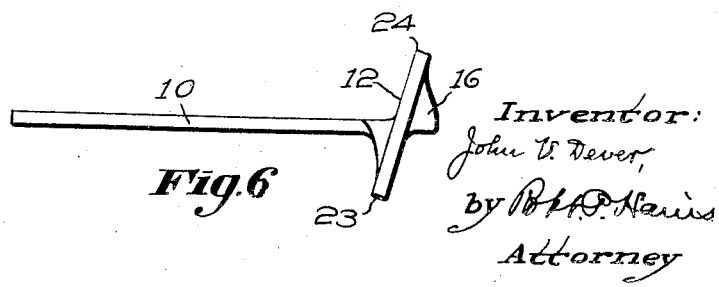
Fig. 6 is a plan view of Fig. 4.

The head 12 is elongated and is disposed at substantially a right angle to the length of the lever as clearly shown in Fig. 6, and is connected to the lever by a neck 16.

The construction of the fastener 10 is such that it may be readily and inexpensively blanked out of sheet metal with the head lying in the general plane of the lever, after which the neck 16 may be twisted to support the head substantially transverse of the lever as shown.

Figure 2:
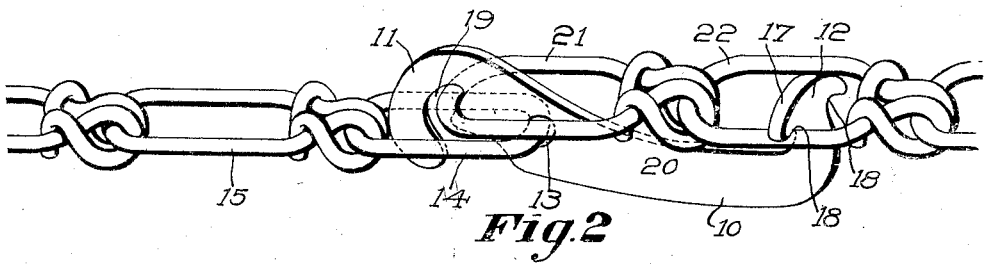
Fig. 2 is a similar view showing the fastener advanced to the chain tightening position and about to be placed in locking engagement with a chain link.
Figure 3:
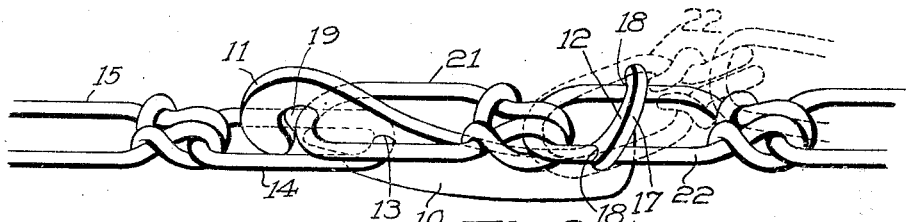
Fig. 3 is a perspective view showing the fastener moved to its final chain connecting position; one of the links of the chain being shown dotted in the position it assumes immediately before the fastener moves into its final position.

The configuration of the head 12 may be varied as desired, but the length of the head should be greater than the distance between the sides of the link to which the head is to be secured, so that the head will rest upon opposite sides of a link when extending transversely thereof as shown in Fig. 3. In the embodiment shown, the head 10 has a curved face 17 which facilitates the insertion of the head through a link, and at the juncture of the head with the neck 16, are provided rounded shoulders 18 adapted to rest firmly upon the opposite side of a link as will be apparent from Figs. 2 and 3.

The hook 11 is conveniently provided by forming a notch 19 in the lever adjacent one end thereof, and this notch is preferably formed as shown so that the link will be retained in engagement therewith while the lever is swung from the position shown in Fig. 1 to that shown in Fig. 2.

When it is desired to connect the chain 15 to its other end, or to a different chain 20, the hook 11 is engaged with a link 21 thereof, and the lever is swung from the position shown in Fig. 1 to that shown in Fig. 2. This movement serves to tighten the chains, and as the head 10 reaches a link 22 of the chain 20, the end 23 of the head may be readily inserted through the link as clearly shown in Fig. 2. Then if the link 22 is moved to the position shown in dotted lines in Fig. 3, the curved face 17 of the head will slide along the opposite side of the link until the end 24 of the head slips through the link to the position shown in Fig. 3. After the head has been passed through the link 22 the shoulders 18 will rest firmly upon the opposite sides of the link, and the construction of the lever is such that a pull upon the chains holds the shoulders firmly against the link. Furthermore, the size of the neck 16 is preferably such that it will extend across the link from one side to the other to limit the movement between the neck and link.

As above stated, the head 12 is so constructed that it will enter a link of the chain only when the head extends substantially lengthwise of the link, and as a result of this construction, when the parts are connected as shown in Fig. 3, the shoulders 18, the neck 16, and the longitudinal pull upon the lever and chains all serve to prevent the lever from becoming accidentally disengaged from the link.

In most instances it will be found desirable to construct the fastener so that the head 12 will extend across the fastener at an angle that is inclined slightly to a right angle, as clearly shown in Fig. 6. This construction facilitates the insertion of the end 23 of the head through the link and over one side thereof, whereupon the other side of the link slides along the curved surface 17 until it slips over the end 24 of the head and the parts move into the position shown in full lines in Fig. 3.

Figure 4:
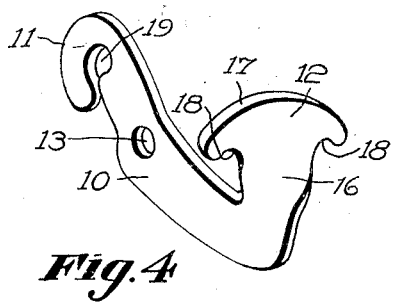
Fig. 4 is a perspective view of the fastener removed from the chains.
Figure 5:
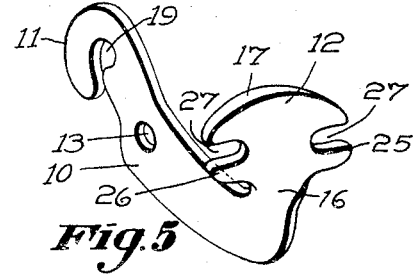
Fig. 5 is a view similar to Fig. 4 but showing a slightly modified form of fastener.

The modified type of fastener shown in Fig. 5 is similar in construction and operation to the fastener shown in the other figures except that in this figure, the fastener is provided with lugs 25 and 26 positioned to form notches 27 between the head and lugs in which the side members of the link are received. The fastener shown in Fig. 5 may be engaged with and disengaged from a link the same as the fastener of Fig. 4 but the lugs 25 and 26 serve to further restrict movement between the link and fastener after the parts are connected.

Claims.

1. In combination with a chain, a chain fastener of sheet metal connected to the chain and comprising a lever having a hook at one end and an elongated head at the other end, a twisted neck extending laterally from the lever and forming a rigid connection, between the lever and head, that supports the head laterally spaced from the lever and disposed transversely thereof, said chain fastener being adapted to be removably secured to the chain by engaging the hook with one link of the chain and by inserting the head through a second link of the chain so that the head bridges across the link.

2. In combination with a chain formed of elongated links, a chain fastener comprising a lever having a hook at one end and an elongated head at its other end, a neck extending laterally from the lever and forming a rigid connection between the lever and head, that supports the head laterally spaced from the lever and disposed transversely thereof, said chain fastener being adapted to be removably secured to the chain by engaging the hook with one link of the chain and by inserting the head through a second link of the chain so that the head, bridges across the link, and a link having permanent engagement with an intermediate portion of the lever.

3. A chain tightener and fastener, comprising, in combination, a lever having means at one end thereof for removably engaging a link of a chain and an elongated head at its other end, a neck extending laterally from the lever and forming a rigid connection between the lever and head, that supports the head laterally spaced from the lever and disposed transversely thereof, said lever adapted to tighten and secure a chain by engaging the means at one end of the lever with a link of a chain and then moving the lever into position to insert the head through a second link so that the head will bridge across the link, and a link having permanent engagement with an intermediate portion of the lever.

4. A chain tightener and fastener, comprising, in combination, a lever having a hook at one end and an elongated head at the other end, a neck forming a rigid connection between the lever and head and adapted to support the head to one side of the longitudinal axis of the lever and with the longitudinal axis of the head forming an angle with the axis of the lever that is slightly greater than a right angle, said lever adapted to tighten and secure a chain by engaging the hook of the lever with one link of a chain and moving the lever into position to pass the head through a second link of the chain and into position to bridge across the link, and having link engaging means intermediate the ends of the lever.

5. In combination with a chain, a chain tightener and fastener comprising a sheet metal lever connected intermediate of its ends to a chain and having a hook at one end and a flattened elongated head at the other end, a neck extending laterally from the body portion of the lever to support the head laterally spaced from the lever and the neck being twisted to dispose the head cross-wise of the lever, shoulders upon the head adjacent the juncture of the head with the neck, said lever being adapted to tighten and secure a chain by engaging the hook of the lever with one link of a chain and by moving the lever into position to pass the head through a second link of the chain and into position to bridge across the link with the shoulders resting upon the sides of the link.

6. A chain fastener, comprising, in combination, a lever having a hook at one end and an elongated flattened head at the other end, a neck forming a rigid connection between the lever and head and adapted to support the head to one side of the longitudinal axis of the lever and with the head disposed cross-wise of the lever, shoulders upon the head adjacent the juncture of the head with the neck and adapted to seat upon the opposite sides of a link when said neck extends through the link, a rounded surface upon the top of the head curved in the form of an arc extending lengthwise of the head and serving to guide the head through a link of the chain, and link engaging means formed intermediate the ends of the lever.

In testimony whereof, I have signed my name to this specification.

JOHN VINCENT DEVER.